United States Patent [19]

Cummings et al.

[11] Patent Number: 5,585,134
[45] Date of Patent: Dec. 17, 1996

[54] PRODUCTION OF RUMEN-BYPASS FATTY ACID SALT AND PROTEIN DIETARY SUPPLEMENT

[75] Inventors: Kenneth R. Cummings, Skillman, N.J.; Conor Rudden, Creeney, Ireland

[73] Assignee: Volac, Inc., United Kingdom

[21] Appl. No.: 498,656

[22] Filed: Jul. 3, 1995

Related U.S. Application Data

[63] Continuation of Ser. No. 83,261, Jun. 29, 1993, abandoned.
[51] Int. Cl.⁶ .................. A23L 1/20; A23K 1/18
[52] U.S. Cl. .............. 426/630; 424/438; 426/635; 426/656; 426/807
[58] Field of Search ................. 426/630, 635, 426/648, 807, 632, 656; 424/438, 442

[56] References Cited

U.S. PATENT DOCUMENTS

| | | | |
|---|---|---|---|
| 2,762,820 | 9/1956 | Sugarman | 554/11 |
| 2,991,178 | 7/1961 | Clayton | 426/630 |
| 4,826,294 | 5/1989 | McAskie | 426/74 |
| 5,151,283 | 9/1992 | Foehse | 426/618 |
| 5,250,714 | 10/1993 | Lajoie | 426/807 |
| 5,270,062 | 12/1993 | Bucks | 426/630 |

FOREIGN PATENT DOCUMENTS

| | | | |
|---|---|---|---|
| 3119967 | 5/1991 | Japan | 426/630 |
| 2113521 | 8/1983 | United Kingdom . | |

*Primary Examiner*—Daniel Stemmer
*Attorney, Agent, or Firm*—Irving M. Fishman

[57] ABSTRACT

This invention provides a process for the preparation of a ruminant dietary product comprising a blend of fatty acid salt and denatured protein. In the process, whole proteinaceous oilseed in particulate form is treated with a basic alkaline earth metal compound. The oil content of the oilseed is saponified to a fatty acid salt, and the protein content is denatured into a water-insoluble form. The fatty acid salt and denatured protein ingredients of the invention ruminant dietary product have rumen-bypass properties, and are metabolized in the post-rumen digestive tract under ruminant feeding conditions.

13 Claims, No Drawings

PRODUCTION OF RUMEN-BYPASS FATTY ACID SALT AND PROTEIN DIETARY SUPPLEMENT

This application is a continuation of application Ser. No. 08/083,261, filed Jun. 29, 1993, now abandoned.

BACKGROUND OF THE INVENTION

Conventional cattle feeds such as corn and alfalfa often fail to provide sufficient energy for cattle, especially lactating dairy cattle during periods of heavy milk production. Feed containing a high proportion of corn also has a tendency to depress the milk fat content of the milk produced by such cattle. Fat is an excellent energy source, and it is known that if the proportion of fat in cattle food is increased, lactating dairy cattle produce high milk yields without draining their reserves of body fat and without diminishing the proportion of milk fat in the milk produced.

However, it has been found that if the proportion of fat in the diet of cattle exceeds about 3–5% of the total feed solids, the feed has toxic effects upon the microorganisms in the rumen of the cattle. It appears that fat reduces the growth rate or even kills certain microorganisms which digest fiber in the cow's rumen, thereby lowering fiber digestibility. This deleterious effect on the cow's rumen is particularly true of unsaturated fats. Although the decreased fiber digestion in the rumen is partially compensated by greater fiber digestion in the lower parts of the alimentary canal, such later fiber digestion produces a blend of different fatty acids than that which is produced by the digestion in the rumen, and the different blend of fatty acids is less suited to the cow's metabolism.

There has been a continuing need for new fat-containing dietary supplements for animal feed which can be fed to ruminant animals without interfering with the rumen microorganisms.

U.S. Pat. Nos. 4,642,317; 4,826,694; 4,853,233; and 4,909,138 describe the incorporation of insoluble fatty acid salts in ruminant feed as a means of increasing the fat content of the feed without deleteriously affecting the ruminant digestion cycle. A feed additive such as fatty acid calcium salt functions as a rumen-bypass product, and is subsequently metabolized in the abomasum or small intestine of the ruminant.

Similar effort has been directed to the prevention of protein deamination in the rumen of polygastric animals, while preserving the capacity of protein nutrients to be assimilated in the lower regions of the ruminant alimentary tract.

U.S. Pat. Nos. 3,720,765; 3,988,480; 4,211,795; 4,225,620; and 5,064,665 describe methods for producing a protein derivative which has rumen-bypass capability.

One method of providing a rumen-bypass protein is by pelleting soybean meal with lignosulfonate.

GB 2113521 describes a ruminant feedstuff comprising an animal or vegetable protein nutrient ingredient dispersed in a fatty acid alkaline earth metal salt. A feedstuff is obtained by forming a dispersion of protein meal in an aqueous solution of a water-soluble fatty acid salt, and then adding an aqueous solution of basic alkaline earth metal compound to form water-insoluble fatty acid alkaline earth metal salt which precipitates and coats the dispersed protein meal solids. The coated solids have rumen-bypass capability, and are digested in the abomasum or small intestine of ruminants.

Other methods involve the treatment of protein with formaldehyde, or the heat-treatment of protein to cause browning or crosslinking of the protein.

There is sustained interest in the production of dietary feed supplement products which contain fatty acid and/or protein ingredients which exhibit rumen-bypass properties.

Accordingly, it is an object of this invention to provide a fatty acid salt/protein composition which can function as a rumen-bypass dietary supplement for ruminants, and permit a beneficial increase in the dietary fat and protein content of the feed.

It is another object of this invention to provide a fatty acid/protein animal feed supplement for ruminants, which has rumen-bypass properties and which is metabolized in the post-rumen digestive tract of ruminants.

It is another object of this invention to provide an improved process for production of a blend of fatty acid alkaline earth metal salt and denatured protein, utilizing whole oilseed meal as a starting raw material.

Other objects and advantages of the present invention shall become apparent from the accompanying description and example.

DESCRIPTION OF THE INVENTION one or more objects of the present invention are accomplished by the provision of a process for the preparation of a fatty acid salt and denatured protein ruminant dietary product which comprises (1) forming a reactive admixture of ingredients comprising (a) whole proteinaceous oilseed ingredient in comminuted form, and (b) between about 1–3 equivalents of basic alkaline earth metal compound per equivalent of oilseed fatty acid content, wherein the reactive admixture has a water content between about 0.2–20 weight percent; and (2) maintaining the admixture at a temperature between about 40°–130° C. for a time period sufficient to convert at least 70 percent of the total fatty acid content to fatty acid alkaline earth metal salt, and to denature the protein to a water-insoluble content of at least 60 percent of the protein, thereby providing a ruminant dietary product having rumen-bypass properties.

The conversion of the total fatty acid content to fatty acid alkaline earth metal salt can be at least about 90 percent, and the water-insoluble content of the denatured protein can be at least 80 percent. The dietary product of the process can contain glycerol in a quantity which is about one-third of a mole per mole of saponified fatty acid. If desired, the content of glycerol can be partially or completely removed by water extraction of the dietary product solids.

In another embodiment this invention provides a rumen-bypass dietary supplement for animals which comprises (1) between about 20–50 weight percent of at least two $C_{12}$–$C_{22}$ fatty acid alkaline earth metal salts; (2) between about 10–45 weight percent of water-insoluble vegetable protein; and (3) between about 0.1–10 weight percent of glycerol; wherein the fatty acid salt and protein ingredients are metabolized in the post-rumen digestive tract under ruminant feeding conditions.

A content of glycerol in a present invention ruminant dietary supplement product can contribute desirable properties to the product. Glycerol can reduce dust and improve the appearance and consistency of dietary product granules. Glycerol also can function as a deodorizing agent, and improve the palatability of the dietary product for ruminant feeding.

In the process for production of an invention ruminant dietary product, the whole oilseed ingredient typically has an oil content between about 15–50 weight percent, and a protein content between about 20–60 weight percent.

Suitable whole oilseed raw materials include soybean, cottonseed, rapeseed, linseed, sunflower seed, safflower seed, peanut, palm kernel, corn kernel, coconut (copra), and the like.

The whole oilseed is ground into a meal having an average particle size between about 200–2000 microns. The whole oilseed can be ground in commercial equipment such as a Bauer mill or a Sprout-Waldron CG hammer mill. The whole oilseed also can be comminuted by high shear mixing during the step(1) blending procedure.

The whole oilseed can be ground with hulls intact or in a dehulled state. Dehulling can be accomplished by passing the whole oilseed bulk through a roller mill with fluted rolls, which are driven at different speeds. The loosened hulls are removed from the seed kernels by aspiration or by sieving.

In the invention process, the protein content of the whole oilseed ingredient undergoes a denaturation reaction, which converts water-soluble protein into denatured water-insoluble protein which exhibits rumen-bypass properties. The water-insoluble protein is assimilated in the post-rumen digestive tract of ruminants.

The protein content of a whole oilseed ingredient of the present invention process has a typical molar profile of aminoacids comprising arginine (7–11), histidine (2–4), lysine (3–7), tryptophan (0.5–3), phenylalanine (4–6), methionine (0.5–2), threonine (3–5), leucine (4–9), isoleucine (3–7), valine (4–7) and aspartic acid (6–12).

The fatty acid triglyceride constituency of the oil component of the whole oilseed ingredient is different for the various oilseed sources.

Soybean has a weight percent fatty acid profile comprising lauric (0.5), myristic (0.5), palmitic (12), stearic (4), oleic (25), linoleic (52), and linolenic (6).

Cottonseed has a weight percent fatty acid profile comprising myristic (0.7), palmitic (24), stearic (2), palmitoleic (1), oleic (17), linoleic (55), and linolenic (0.3).

Rapeseed has a weight percent fatty acid profile comprising palmitic (5), stearic (2), oleic (63), linoleic (20), linolenic (9), and eicosenic (1).

The basic alkaline earth metal compound ingredient can be an oxide or hydroxide of calcium or magnesium, and the ingredient can be a mixture of two or more basic alkaline earth metal compounds.

In the invention process, the water content of the reactive admixture in step(1) typically is in the range between about 0.2–20 weight percent. The whole oilseed ingredient has a natural water content, so that the addition of extraneous water to the reactive admixture is not necessary. It is essential that at least a small amount of water is present in order to initiate the oilseed oil saponification reaction. After the saponification is proceeding, water is generated during the fatty acid salt-forming stage, and the saponification reaction becomes self-sustaining.

In the invention process, the step(2) reaction time can vary in the range between about 0.5–4 hours. The process is adaptable for continuous operation.

The step(2) reactive admixture can be sparged with steam to heat the admixture to a temperature between about 80°–130° C. The elevated temperature also can be achieved by utilizing a heated mixer unit, or by preheating the oilseed ingredient by mechanical friction in a comminuting extruder unit.

Other ingredients optionally can be included in the invention process, such as about 0.05–20 weight percent of an additional biologically active ingredient, based on the weight of the recovered dietary product. An optional ingredient can be added during the blending procedure of the invention process.

The optional biologically active constituent utilized in the invention process can be selected from a broad variety of nutrients and medicaments, either as a single component or as a mixture of components, which are illustrated by the following listing of active molecular species:

1. $C_2$–$C_{22}$ aliphatic carboxylic acids and alkali metal, ammonium and alkaline earth metal salts which can be different or have some correspondence with the oilseed fatty acid ingredient present in the process reaction medium.

2. sugars and complex carbohydrates which include both water-soluble and water-insoluble monosaccharides, disaccharides and polysaccharides.

Cane molasses is a byproduct from the extraction of sucrose from sugar cane. It is commercially available at standard 79.5° Brix concentration, which has a water content of about 21 weight percent, and a sugar content of 50 weight percent. Sugar beet byproducts also are available as low cost carbohydrate sources.

Whey is a byproduct of the dairy industry. The whey is a dilute solution of lactalbumin, lactose, fats, and the soluble inorganics from milk. Dried whey solids typically have the following composition.

| | |
|---|---|
| Protein | 12.0% |
| Fat | 0.7% |
| Lactose | 60.0% |
| Phosphorus | 0.79% |
| Calcium | 0.87% |
| Ash | 9.7% |

Another source of carbohydrate is derived from the pulp and paper industry which produces large quantities of byproduct lignin sulfonates from wood during the sulfite pulping process. The carbohydrate byproduct is a constituent of the spent sulfite liquor.

3. aminoacid ingredients either singly or in combination which include arginine, histidine, isoleucine, leucine, lysine, methionine, phenylalanine, threonine, tryptophan, valine, tyrosine ethyl HCl, alanine, aspartic acid, sodium glutamate, glycine, proline, serine, cysteine ethyl HCl, and the like, and analogs and salts thereof.

4. vitamin ingredients either singly or in combination which include thiamine HCl, riboflavin, pyridoxine HCl, niacin, niacinamide, inositol, choline chloride, calcium pantothenate, biotin, folic acid, ascorbic acid, vitamin $B_{12}$ p-aminobenzoic acid, vitamin A acetate, vitamin K, vitamin D, vitamin E, and the like.

Trace element ingredients include compounds of cobalt, copper, manganese, iron, zinc, tin, nickel, chromium, molybdenum, iodine, chlorine, silicon, vanadium, selenium, calcium, magnesium, sodium and potassium.

5. protein ingredients as obtained from sources such as dried blood or meat meal, dried and sterilized animal and poultry manure, fish meal, liquid or powdered egg, fish solubles, cell cream, and the like.

Protein equivalent ingredients include non-protein nitrogen compounds such a urea, biuret, ammonium phosphate, and the like.

6. medicament ingredients either singly or in combination which include promazine hydrochloride, chloromadionate acetate, chlortetracycline, sulfamethazine, monensin, sodium monensin, poloxaline, and the like. Oxytetracycline is a preferred antibiotic for cattle prophylaxis.

7. antioxidants as illustrated by butylated hydroxyanisole, butylated hydroxytoluene, tocopherol, tertiary-butylhydroquinone, propyl gallate, and ethoxyquin; and suitable preservatives include sodium sorbate, potassium sorbate, sodium benzoate, propionic acid, α-hydroxybutyric acid, and the like.

8. suspension stabilizing agents which preferably are selected from nonionic surfactants, hydrocolloids and cellulose ethers. These types of chemical agents are illustrated by polyethylene oxide condensates of phenols, $C_8$–$C_{22}$ alcohols and amines; ethylene oxide reaction products with fatty acid partial esters of hexitans; alkylarylpolyoxy-ethylene glycol phosphate esters; gum arabic; carob bean gum; guar gum; tragacanth gum; ammonium, sodium, potassium and calcium alginates; glycol alginates; xanthan gum; potato agar; alkylcellulose; hydroxyalkylcellulose; carboxyalkylcellulose; and the like.

An invention process embodiment can be conducted in a batch reactor, or as a continuous operation with equipment similar to that described in U.S. Pat. No. 4,826,694. When conducted in a batch or continuous mode, a preferred aspect of the process is an amassment of the reactive admixture in a deep bed or heaped mound configuration, i.e., a bed or mound which is at least 10 inches in depth. The compact bulk of the reactive admixture solids minimizes loss of exothermic heat which is generated during the oilseed oil hydrolysis and salt-forming reactions. Maintenance of the reactive admixture temperature in a range between about 80°–130° C. promotes the saponification reaction toward completion, and moderates denaturation of the oilseed protein ingredient.

In one type of continuous process, particulate whole oilseed and basic alkaline earth metal compound powder are blended in a continuous mixer and sparged with steam (125°–170° C.) to form a hydrated reactive admixture. The admixture is transferred to a slow moving conveyor belt, in the form of a heaped mound which is about 20 inches or more in depth. Because of the reactive admixture compact bulk on the conveyor belt, the process effectively has the advantages of a continuous mode, and inherently has some attributes of a batch procedure. It is a type of continuous batch process.

The elevated temperature and alkaline pH conditions of the invention process are favorable for controlled denaturation of water-soluble proteins into water-insoluble proteins. Water-soluble proteins do not have rumen-bypass properties, and normally are digested in the rumen. Water-insoluble proteins have rumen-bypass properties, and normally are not digested in the rumen. The water-insoluble protein content of a present invention ruminant dietary supplement is metabolized in the post-rumen digestive tract of ruminants.

The conditions of temperature and alkaline pH are moderate with respect to protein denaturation in the practice of the invention process. If the process conditions are overly severe, some of the protein converts into an intractable derivative which bypasses the digestive system of a ruminant and is lost as waste matter.

A further advantage derives from the temperature and alkaline pH conditions of the invention process. Any mycotoxins which are present in the whole oilseed starting material are partially or completely detoxified. An aflatoxin-contaminated oilseed meal can be completely detoxified under the invention processing conditions.

A present invention dietary fatty acid salt/denatured protein composition is adapted to function as a rumen-bypass dietary supplement in ruminant feed. An important advantage of a present invention dietary supplement product is the rumen-bypass protection which extends to all the biologically active ingredients of the product, such as aminoacids, vitamins, and the like, which normally are metabolized in the rumen.

The following example is further illustrative of the present invention. The components and specific ingredients are presented as being typical, and various modifications can be derived in view of the foregoing disclosure within the scope of the invention.

EXAMPLE

This Example illustrates the continuous production of a rumen-bypass dietary fatty acid calcium salt/denatured protein product in accordance with the present invention.

Whole rapeseed meal is employed which contains about 40% oil and 27% protein. The protein content of the whole rapeseed meal starting material has a molar profile of aminoacids comprising arginine (7.2), histidine (3.2), lysine (5.4), tryptophan (2.5), phenylalanine (5.0), methionine (1.5), threonine (4.8), leucine (8.7), isoleucine (4.5), valine (6.5) and aspartic acid (11.0).

The oil content of the whole rapeseed meal starting material has a weight percent profile of fatty acids comprising oleic acid (63), linoleic acid (20), linolenic acid (9), palmitic acid (5) and stearic acid (2).

The process is operated continuously with equipment consisting of an elongated high shear mixer, in combination with a slow moving conveyor belt.

The whole rapeseed meal is introduced into the mixer from a hopper near the front end of the mixer. Calcium oxide is introduced into the mixer from a second hopper which is adjacent to the first hopper, and the mixer is operated at a shear rate of about 1000 rpm. Near the midpoint of the mixer length, steam (150° C.) is introduced into the mixer to hydrate the blended ingredients in the mixer, and to raise the temperature of the blend.

The quantity of calcium oxide is about 60 lbs. per 1000 lbs. of whole rapeseed meal. The steam sparging is at a rate which adds water to a total content of about 10 weight percent of the blended admixture prior to the discharge of the admixture onto the conveyor belt.

The admixture has a temperature of about 80° C. as it is discharged in a heaped mound (about 20 inches deep) on the moving conveyor belt. The compact bulk of the heaped admixture minimizes heat loss as the exothermic rapeseed oil saponification reaction is proceeding. The temperature of the admixture increases to about 110°–120° C., and is maintained at this temperature for about 75 minutes on the moving conveyor belt.

The essentially dry fatty acid calcium salt/denatured protein product is cooled, passed through a sifter, and collected in bags suitable for transportation and storage.

The temperature conditions of the process are sufficient to inactivate any mycotoxins originally present in the whole rapeseed starting material.

The protein content of the whole rapeseed meal starting material consists of about 70 weight percent water-soluble constituents which are digestible in the rumen. The protein content of the ruminant dietary product of the process consists of about 30 weight percent of water-soluble constituents which are digestible in the rumen, and about 70 weight percent of water-insoluble constituents which bypass the rumen and are metabolized in the post-rumen digestive tract of a ruminant.

The ruminant dietary product contains about 80 weight percent of the total fatty acid content in the form of calcium salt.

The process is repeated with whole soybean meal starting material instead of whole rapeseed meal. The protein of the whole soybean meal starting material has a molar profile of aminoacids comprising arginine (8.3), histidine (2.6), lysine (6.8), tryptophan (1.0), phenylalanine (5.0), methionine (1.0), threonine (3.9), leucine (7.5), isoleucine (6.5), valine (5.5) and aspartic acid (6.2) .

The oil content of the whole soybean meal starting material has a weight percent profile of fatty acids comprising linoleic acid (52), oleic acid (25), palmitic acid (12), linolenic acid (6), stearic acid (4) and lauric acid (0.5).

The process is repeated with whole cottonseed meal instead of whole rapeseed meal. The protein content of the whole cottonseed meal starting material has a molar profile of aminoacids comprising arginine (10.9), histidine (2.8), lysine (3.9), tryptophan (0.9), phenylalanine (4.9), methionine (1.7), threonine (3.4), leucine (4.5), isoleucine (3.2), valine (4.1) and aspartic acid (10.0).

The oil content of the whole cottonseed meal starting material has a weight percent profile of fatty acids comprising linoleic acid (55), palmitic acid (24), oleic acid (17), stearic acid (2), myristic acid (0.7) and linolenic acid (0.3).

Each of the three process embodiments described above is repeated, except that methionine hydroxy analog is added as an ingredient during the blending stage. The added quantity provides about 2.0 weight percent of methionine hydroxy analog in the ruminant dietary product.

If the process embodiments are conducted with a bed or heaped mound of reactive admixture on the conveyor belt which is about 6 inches or less in depth, then the saponification of oilseed oil is less complete, and the amount of water-insoluble constituents in the protein content of the dietary supplement endproduct is about 40 weight percent.

An invention fatty acid calcium salt/protein product, such as that derived from whole rapeseed as illustrated above, can be incorporated as a dietary supplement in cattle feed such as hay silage or corn silage, in a quantity which will provide each animal about 1000 grams per day of fatty acid salt, and about 500 grams per day of denatured protein.

What is claim is:

1. A process for the preparation of a fatty acid salt and denatured protein ruminant dietary product from whole proteinaceous oilseed which comprises (1) forming a reactive admixture in a mixer, and discharging the reactive admixture on a supporting surface to form a deep bed at least 10 inches in depth of the reactive admixture of ingredients comprising (a) whole proteinaceous oilseed ingredient in comminuted form, and (b) between about 1–3 equivalents of basic alkaline earth metal compound per equivalent of oilseed fatty acid content, wherein the reactive admixture has a water content between about 0.02–20 weight percent; and (2) maintaining the discharged admixture at a temperature between about 40°–130° C. for a time period between about 0.5–4 hours sufficient to convert at least 90 percent of the total fatty acid content to fatty acid alkaline earth metal salt, and to denature the protein to a water-insoluble content of at least 80 percent of protein, thereby providing a ruminant dietary product having rumen-bypass properties.

2. A process in accordance with claim 1 wherein the oilseed ingredient has an oil content between about 15–50 weight percent, and a protein content between about 20–60 weight percent.

3. A process in accordance with claim 1 wherein the oilseed ingredient is dehulled before comminution.

4. A process in accordance with claim 1 wherein the oilseed ingredient is soybean, cottonseed, rapeseed, linseed, sunflower seed, safflower seed, peanut, palm kernel, corn kernel, coconut, or a mixture thereof.

5. A process in accordance with claim 1 wherein the basic alkaline earth metal compound is an oxide or hydroxide of calcium or magnesium, or a mixture of compounds.

6. A process in accordance with claim 1 wherein the step(1) blending procedure includes between about 0.05–20 weight percent of an additional biologically active ingredient, based on the weight of the recovered dietary product.

7. A process in accordance with claim 1 wherein the step(1) blending procedure includes between about 0.05–20 weight percent of an aminoacid ingredient, based on the weight of the recovered dietary product.

8. A process in accordance with claim 1 wherein the step(1) blending procedure includes between about 0.05–20 weight percent of an aminoacid ingredient selected from methionine, lysine, nicotinamide, and analogs and salts thereof, based on the weight of the recovered dietary product.

9. A process in accordance with claim 1 wherein in step(2) the reactive admixture is sparged with steam to heat the admixture to a temperature between about 80°–130° C.

10. A process in accordance with claim 1 which is operated continuously, and the step(2) reaction time is between about 0.5–4 hours.

11. A process in accordance with claim 1 wherein the dietary product content of denatured water-insoluble protein has rumen-bypass properties, and is digestible in the lower intestine of ruminants.

12. A process in accordance with claim 1 wherein the dietary product has a molar profile of aminoacids comprising arginine (7–11), histidine (2–4), lysine (3–7), tryptophan (0.5–3), phenylalanine (4–6), methionine (0.5–2), threonine (3–5), leucine (4–9), isoleucine (3–7), valine (4–7) and aspartic acid (6–12).

13. A process in accordance with claim 1 wherein the dietary product is recovered in the form of friable solids.

* * * * *